US008850179B2

(12) United States Patent
Anspach et al.

(10) Patent No.: US 8,850,179 B2
(45) Date of Patent: *Sep. 30, 2014

(54) ENCAPSULATION OF SECURE ENCRYPTED DATA IN A DEPLOYABLE, SECURE COMMUNICATION SYSTEM ALLOWING BENIGN, SECURE COMMERCIAL TRANSPORT

(75) Inventors: Steve Anspach, Tampa, FL (US); Salazar Luke, St. Petersburg, FL (US); Brian Heyliger, Wesley Chapel, FL (US); Greg Kasson, Clearwater, FL (US); Jeff West, Bandon, FL (US)

(73) Assignee: TeleCommunication Systems, Inc., Annapolis, MD (US)

( * ) Notice: Subject to any disclaimer, the term of this patent is extended or adjusted under 35 U.S.C. 154(b) by 691 days.

This patent is subject to a terminal disclaimer.

(21) Appl. No.: 11/898,724

(22) Filed: Sep. 14, 2007

(65) Prior Publication Data

US 2009/0077375 A1 Mar. 19, 2009

Related U.S. Application Data

(63) Continuation of application No. 10/699,834, filed on Nov. 4, 2003, now Pat. No. 7,533,259.

(60) Provisional application No. 60/502,660, filed on Sep. 15, 2003.

(51) Int. Cl.
*H04L 9/00* (2006.01)
(52) U.S. Cl.
USPC .......................................... 713/150; 713/160
(58) Field of Classification Search
None
See application file for complete search history.

(56) References Cited

U.S. PATENT DOCUMENTS

| 4,853,830 | A |   | 8/1989  | Corfits |
|-----------|---|---|---------|---------|
| 5,305,377 | A |   | 4/1994  | D'Arcy  |
| 5,562,695 | A |   | 10/1996 | Obenchain |
| 5,982,888 | A |   | 11/1999 | Luckeneder |
| 5,991,293 | A | * | 11/1999 | Buchanan et al. ............ 370/353 |
| 6,101,543 | A | * | 8/2000  | Alden et al. .................. 709/229 |
| 6,118,768 | A |   | 9/2000  | Bhatia   |
| 6,144,667 | A |   | 11/2000 | Doshi    |

(Continued)

FOREIGN PATENT DOCUMENTS

EP  1283630 A2  1/2002

OTHER PUBLICATIONS

DiFrancisco et al., "Global Broadcast Service (GBS) End-to-End Services: Protocols and Encapsulation", IEEE, 2000, pp. 704-709.*

(Continued)

*Primary Examiner* — William Powers
(74) *Attorney, Agent, or Firm* — William H. Bollman

(57) ABSTRACT

Sensitive, Type 1 KIV-encrypted data is encapsulated into IP packets in a remotely deployed, secure communication system. The IP packets are addressed to a matching IP encapsulator/decapsulator device over the public Internet or other IP protocol network, that then passes it to a similar Type 1 KIV device for decryption. Thus, sensitive, encrypted data is made to appear as if it were any other commercial network data, cloaking it in the vast and busy world of the Internet. The present invention is embodied in a system that provides secure Voice-Over-IP (VoIP), video and data network functionality in a single, small size deployable case, to a remote user. Most importantly, the embodiment allows for the routing of bulk encrypted (i.e., secure) data over a public network, e.g., the Internet.

23 Claims, 5 Drawing Sheets

(56) References Cited

U.S. PATENT DOCUMENTS

| | | | |
|---|---|---|---|
| 6,275,573 | B1 | 8/2001 | Naor et al. |
| 6,282,204 | B1 | 8/2001 | Balatoni |
| 6,415,329 | B1 | 7/2002 | Gelman |
| 6,496,867 | B1 | 12/2002 | Beser |
| 6,549,229 | B1 | 4/2003 | Kirby |
| 6,640,248 | B1 | 10/2003 | Jorgensen |
| 6,661,677 | B1 | 12/2003 | Rumney |
| 6,700,694 | B2 | 3/2004 | Zou |
| 6,766,451 | B1 * | 7/2004 | Van Rijnsoever ............. 713/160 |
| 6,792,615 | B1 * | 9/2004 | Rowe et al. ...................... 725/37 |
| 6,804,776 | B1 * | 10/2004 | Lothberg et al. ............. 713/160 |
| 6,954,520 | B1 | 10/2005 | Lang |
| 6,978,308 | B2 | 12/2005 | Boden |
| 7,023,818 | B1 | 4/2006 | Elliott |
| 7,023,996 | B2 | 4/2006 | Stephenson |
| 7,184,550 | B2 * | 2/2007 | Graunke ......................... 380/42 |
| 7,236,455 | B1 | 6/2007 | Proudler |
| 7,461,249 | B1 | 12/2008 | Pearson |
| 2001/0003846 | A1 | 6/2001 | Rowe |
| 2002/0004898 | A1 | 1/2002 | Droge |
| 2002/0009060 | A1 | 1/2002 | Gross |
| 2002/0010866 | A1 | 1/2002 | McCullough |
| 2002/0031126 | A1 | 3/2002 | Crichton |
| 2002/0059516 | A1 * | 5/2002 | Turtiainen et al. ............ 713/153 |
| 2002/0141389 | A1 | 10/2002 | Fangman |
| 2002/0157114 | A1 | 10/2002 | Mobley |
| 2003/0121047 | A1 | 6/2003 | Watson |
| 2003/0128696 | A1 | 7/2003 | Wengrovitz |
| 2003/0235209 | A1 | 12/2003 | Garg |
| 2004/0153643 | A1 | 8/2004 | Correll |
| 2005/0060539 | A1 * | 3/2005 | Anspach ....................... 713/160 |
| 2005/0063352 | A1 | 3/2005 | Amara |

OTHER PUBLICATIONS

Davis et al., "Information Dissemination Via Global Broadcast Service (GBS)", IEEE, 1996, pp. 506-511.*
Ellington et al., "Exploiting Commercial DBS Technologies to Provide a Military Global Broadcast Service (GBS)", IEEE, 1996, pp. 528-511.*
Dtech Labs, Inc., Dwyer, james, protest under 37 CFR 1.291, Jun. 2007, pp. 1-19.
Klas Ltd, The Complete PC Solution for the KIV-7, pp. 1-4.
Mykotronx, KIV-7 Embeddable KG-84 COMSEC Module, Jul. 1998, pp. 1-2.
Granite Island Group, Secure Telephone Units, Crypto Key Generators, Encryption Equipment, and Scramblers, Technical Surveillance Counter Measures, 2002, pp. 1-58.
Difrancisco, Michael, et al., Booz-Allen & Hamilton, Global Broadcasts Service (GBS) End-to End Services: Protocols and Encapsulation, pp. 704-709.
Shake, Thomas H., Distributed Systems Group, Lincoln Lab., Massachusetts Institute of Technology, Security in Military/Commercial Communication Gateways, pp. 469-474.
"ViaSat KIV-21 Internet Protocol Crypto Receives National Security Agency Certification." ViaSat website. Accessed Jan. 31, 2011. Article published on May 10, 2000.
Cisco Systems, CISCO 1751 Modular Access Router, 1992-2003, pp. 1-19.
L-3 Communications' OMNI Secure Terminal Receives National Security Agency—NSA—Certification, published Jun. 12, 2002 in Business Wire.
Nortel Network, Securing Voice accorss the Internet retrieved date May 5, 2008 http://www.nortel.com/products/01/contivity/collateral/nn101720-0902.odf 2002.
Lin, Tzung-Pao; "Switch Access Architecture for Quad Voice Lines with Data On-Demand per ISDN BRI;" Apr. 1989; IEEE; Infocom '89, pp. 647-654.
Diversified Technology LLC, Sectera BDI Terminal Satcase Datasheet Marketing Literature, Published Nov. 2003. Document displays Secure Communications Terminal featuring removable faceplate for encryption device.

Diversified Technology, LLC, Schematic BDI100A2003A Removable Faceplate, published Nov. 17, 2003, document describes Bracket to Hold SCIP/FNBOT Encryption Device as part of a Secure Communications Terminal.
Diversified Technology LLC, Schematic BDI100A2005A Sectera Bracket, Published Nov. 17, 2005, document describes Bracket to Hold SCIP/FNBOT Encryption Device Beneath Removable Faceplace as part of a Secure Communications Terminal.
Diversified Technology, LLC, Schematic BDM100A2001A Chassis, Published Nov. 17, 2003, Document describes Chassis to Hold SCIP/FNBT Encryption Device as part of a Secure Communications Terminal.
Diversified Technologies, LLC Schematic BDI100A2002A Cover Plate, Published Nov. 17, 2003, document describes Cover Plate to Hold Removable SCIP/FNBDT Faceplate as part of a Secure Communications Terminal.
Diversified Technologies, LLC, 3D Cad Drawing, Published Nov. 17, 2003, document shows Removable Cover Plate Assembly as part of Secure Communications Terminal.
Diversified Technology, LLC, Press Release Only Secure Ip Gateway, Published Aug. 1, 2004, document announces enhanced version of Secure Communications Terminal featuring Removable Faceplate for SCIP/FNBDT Encryption Device.
Diversified Technology, LLC, Onyx Datasheet, Published Aug. 1, 2004, document describes enhanced version of Secure Communications Terminal featuring Removable Faceplate for SCIP/FNBDT Encryption Device.
Diversified Technologies, LLC, BDI-100A Operations Manuel Published Oct. 20, 2003, pp. 1 and 2 shown, Operations Manual for Secure Communications Terminal featuring Removable Faceplate for SCIP/FNBDT Encryption Device.
Diversified Technology, LLC, Sectera BDI Terminal Satcase Datasheet Marketing Literature, Published Nov. 2003. Document displays Secure Communications Terminal featuring Removable Faceplate for SCIP/FNBDT Encryption Device.
Diversified Technology, LLC, Schematic BDI100A2003A Removable Faceplate, Published Nov. 17, 2003, Document describes Removable Faceplate for SCIP/FNBDT Encryiption Device as part of a Secure Communications Terminal.
Diversified Technology, LLC, Schematic BDI100A2005A Sectera Bracket, Published Nov. 17, 2003, Document describes Bracket to Hold SCIP/FNBDT Encryption Device Beneath Removable Faceplace as part of a Secure Communications Terminal.
Diversified Technology, LLC, Schematic BDI100A2001A Chassis, Published Nov. 17, 2003, Document describes Chassis to Hold SCIP/FNBDT Encryption Device as part of a Secure Communications Terminal.
Diversified Technology, LLC, Schematic BDI100A2002A Cover Plate, Published Nov. 17, 2003, Document describes Cover Plate to Hold Removable SCIP/FNBDT Faceplate as part of a Secure Communications Terminal.
Diversified Technology, LLC, 3D CAD Drawing, Published Nov. 17, 2003, Document shows Removable Cover Plate Assembly as part of a Secure Communications Terminal.
Diversified Technology, LLC, Photograph, Published Nov. 17, 2003, Document shows SCIP/FNBDT Encryption Device in Cradle With Removable Faceplate Removed as part of a Secure Communications Terminal.
Diversified Technology, LLC, Sales Order, Published Dec. 19, 2003, Document shows Commercial Sale of Secure Communications Terminal Featuring Removable Faceplate for SCIP/FNBDT Encryption Device.
Diversified Technology, LLC, Shipping/Invoice 2004-001, Published Dec. 24, 2003, Document shows Shipment and Invoice for Commercial Sale of Secure Communications Terminal Featuring Removable Faceplate for SCIP/FNBDT Encryption Device.
Diversified Technology, LLC, Shipping/Invoice 2004-013, Published Jan. 23, 2004, Document shows Shipment and Invoice for Commercial Sale of Secure Communications Terminal Featuring Removable Faceplate for SCIP/FNBDT Encryption Device.
Diversified Technology, LLC, Press Release Onyx Secure IP Gateway, Published Aug. 1, 2004. Document announces enhanced version

(56) References Cited

OTHER PUBLICATIONS of Secure Communications Terminal featuring Removable Faceplate for SCIP/FNBDT Encryption Device.

Diversified Technology, LLC, Onyx DataSheet, Published Aug. 1, 2004. Document describes enhanced version of Secure Communications Terminal featuring Removable Faceplate for SCIP/FNBDT Encryption Device and precursor product (Onyx 100) released 2002.

Diversified Technology, LLC, BDI-100A Operations Manual, Published Oct. 20, 2003. pp. 1 and 2 shown. Operations Manual for Secure Communications Terminal featuring Removable FacePlate for SCIP/FNBDT Encryption Device.

Di Francisco, Michael; Stephenson, Joy; Ellis, Christpher. Global Broadcast Service (GBS) End-to-End Services: Protocols and Encapsulation. Booz Allen & Hamilton. Mclean, Virginia. 2000. IEEE. pp. 704-709.

KIV-7 Family. http://fas.org/irp/program/security/_work/kiv-7.html. Accesses on Jul. 2, 2007. pp. 1-3. Jul. 8, 2001.

KIV-21 ViaSat IP Crypto. ViaSat. http://www.viasat.com/_files/_08fe203b613bc02b87de181a370e2bdf/pdf/KIV_21_01.pdf Accessed on Jul. 2, 2007. pp. 1-2/ Oct. 5, 2001.

L-3 Communications OMNI Secure Terminal Receives National Security Agency—NSA—Certification, Jun. 12, 2002, See for instance capabilities, Ret. Date Oct. 10, 2009.

http://www.ietf.org/rfc/rfc2406.txt, retrieved date Nov. 20, 2008.

Mykrotronix, "KIV-7 Embeddable KG-84 COMSEC Module," Jul. 1, 1998, pp. 1-2.

\* cited by examiner ered by reference; which in turn claims priority from U.S. Provisional Application No. 60/502,660, entitled "Encryption of Voice and Data in a Single Data Stream in a Deployable, Secure Communication System", filed Sep. 15, 2003.

ENCAPSULATION OF SECURE ENCRYPTED DATA IN A DEPLOYABLE, SECURE COMMUNICATION SYSTEM ALLOWING BENIGN, SECURE COMMERCIAL TRANSPORT

The present application claims priority from U.S. application Ser. No. 10/699,834, entitled "Encapsulation of Secure Encrypted Data in a Deployable, Secure Communication System Allowing Benign, Secure Commercial Transport", filed Nov. 4, 2003, now U.S. Pat. No. 7,533,259, which is explicitly incorporated herein by reference; which in turn claims priority from U.S. Provisional Application No. 60/502,660, entitled "Encryption of Voice and Data in a Single Data Stream in a Deployable, Secure Communication System", filed Sep. 15, 2003.

BACKGROUND OF THE INVENTION

1. Field of the Invention

This invention relates generally to computer and communication networks, and more specifically, to handling of encrypted data in a deployable communication system used to provide secure voice, video and data services to multiple remote users.

2. Background of Related Art

FIG. 5 is a depiction of a conventional deployable secure communication system.

In particular, as shown in FIG. 5, a secure encryption module such as defined by KIV-7 standards 912 with suitable interface hardware is utilized in a direct connection path between a remote user 910 and a wireless connection to a similarly secure receiver via a satellite antenna 914. In the conventional system of FIG. 5, an ISDN link is utilized between the module 912 including a KIV-7 encryption module, and a suitable satellite two-way communication transceiver and antenna 914.

In operation, voice data is encrypted by the Type 1 encryption unit 912. The encryption unit 912 has a serial data output, e.g., a synchronous serial output such as is defined by RS-530 standards.

The serial data passed from the encryption unit 912 is converted into an ISDN data stream by a suitable serial-to-ISDN converter 917, and transmitted in a secure environment over a physically secure satellite, e.g., an M4 INMARSAT satellite terminal.

It is vitally important that encryption units 912 stay physically secured, to maximize protection of the information being passed thereover. Also, to further maximize protection of the information, the satellite terminal 914 is conventionally set up and maintained within a secure environment, and travels with the secure encryption module.

Conventional systems are typically physically large, e.g., the size of a van. More importantly, such conventional systems require all elements to be maintained in a secure environment, including the data transport system (e.g., satellite communication system) over which the data travels to another secure communications terminal. Such secure data transport systems are costly to install and maintain, and always run a risk of being compromised.

There is a need for a small, lightweight, easily portable and easily deployable communication system that is not only even more secure than conventional systems, but which also allows flexibility in use of non-secure data transport systems.

BRIEF DESCRIPTION OF THE DRAWINGS

Features and advantages of the present invention will become apparent to those skilled in the art from the following description with reference to the drawings, in which.

SUMMARY OF THE INVENTION

Figure 1:
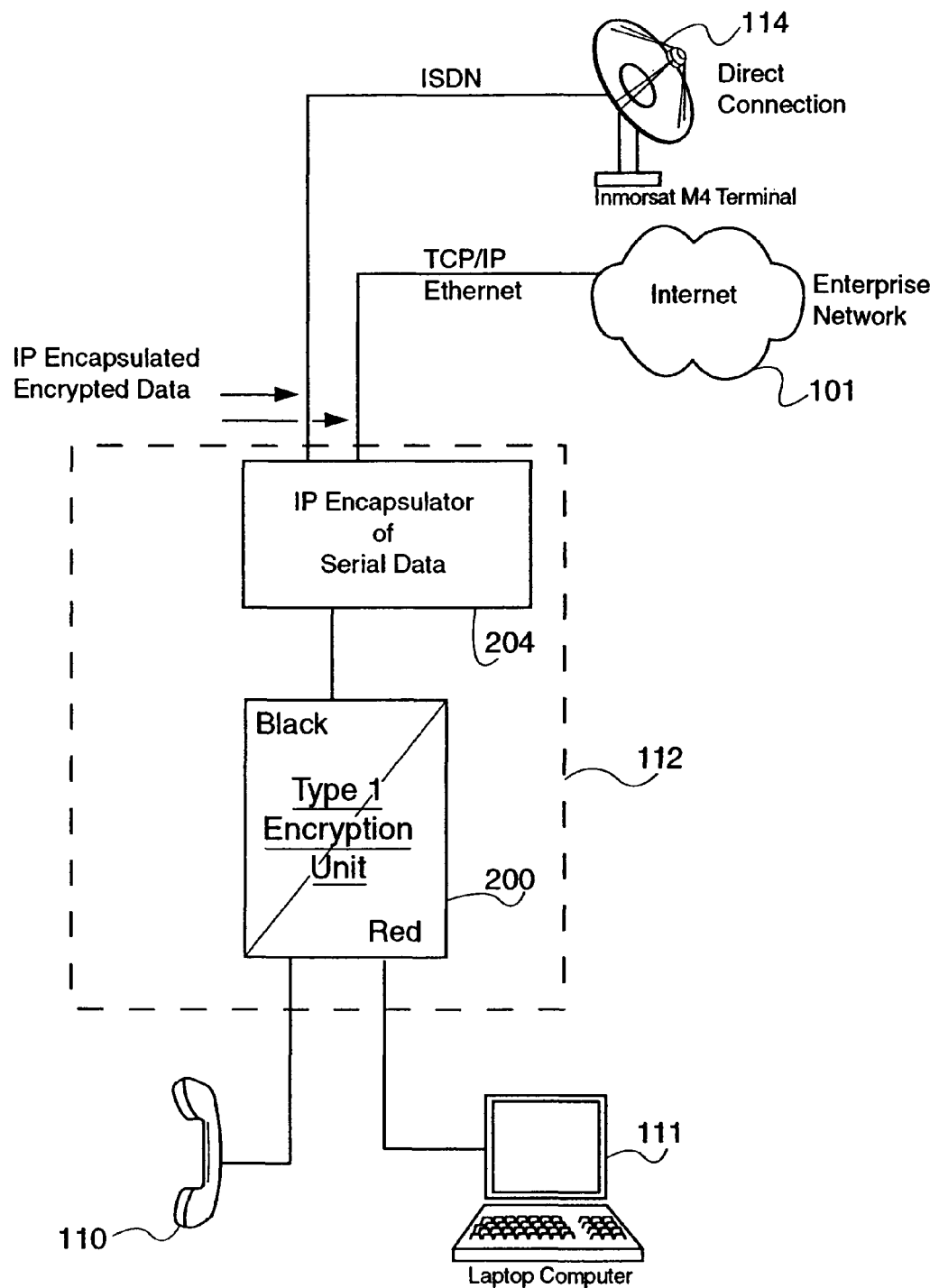
FIG. 1 is a block diagram of an exemplary deployable secure communication system, in accordance with a first embodiment of the present invention.

In accordance with the principles of the present invention, a method and means for cloaking encrypted data comprises encapsulating a serial data stream of encrypted data into IP packets. The IP packets of encrypted data are transmitted on a public IP network.

In accordance with another aspect of the present invention, a secure communications device comprises means for encrypting a data stream into an encrypted data stream. Means for encapsulating the encrypted data stream transmits the encrypted data stream to another secure communications device using IP protocol. Means for routing the encapsulated, encrypted data stream routes the encapsulated, encrypted data stream over an Internet.

DETAILED DESCRIPTION OF ILLUSTRATIVE EMBODIMENTS

Sensitive, Type 1 KIV-encrypted data is encapsulated into IP packets in a remotely deployed, secure communication system. The IP packets are addressed to an IP device that removes the encapsulated, encrypted data and passes it to a similar Type 1 KIV device for decryption. However, the IP encapsulated, encrypted data is passed over the public Internet, taking advantage of the wide availability and flexibility of the Internet.

In this way, encrypted data need not be maintained within a totally secure network transmission system, because it doesn't look like government encrypted data (i.e., it doesn't look like a KIV signal). Rather, the encrypted data, being encapsulated in IP packets, looks just like any other commercial IP transmission from just about any other IP device. Thus, sensitive, encrypted data is made to appear as if it were any other commercial network data.

The present invention is embodied in a system that provides secure Voice-Over-IP (VoIP), video and data network functionality in a single, small size deployable case, to a remote user. While capable of secure communications, the disclosed system also provides communication capability (VoIP, video and/or data) in a non-secure manner if desired. Most importantly, the embodiment allows for the routing of bulk encrypted (i.e., secure) data over a public network, e.g., the Internet.

The disclosed deployable secure communications system can be deployed even at the most remote regions of the world where no other communication means are available, taking advantage of the satellite direct connection link, or (very importantly) in more developed regions that might include access to the Internet (e.g., in a hotel room, high speedx).

The disclosed deployable secure communications system can be deployed to provide a multitude of applications for remote users. Uses include emergency response, news reporting, public safety, drilling and mining operations, field surveys and other activities that require remote capabilities for video and data transmissions.

The system, once deployed and operational, offers access to the Internet or corporate network using a direct link via an Inmarsat M4 GAN network or ISDN terrestrial circuit. For those systems configured with a KIV-7 encryption device, access to the SIPRNET and other secure voice and data networks is possible. However, importantly, the disclosed deployable secure communication system also provides an access point for a direct link to a local enterprise network providing IP encapsulated information for transmission over a network such as the Internet. In this way, bulk encrypted data may be routed using an available link (e.g., a wired Ethernet port in a hotel room, high speed cable, etc.) Thus, secure data communications and/or voice-over-IP communications over the Internet are possible.

The disclosed deployable communication system provides a single user, or multiple users, remote secure access to a local enterprise network, and thus access to services conventionally provided only to direct connected users. Also, up to two simultaneous voice over IP calls may be established along with normal data connectivity via, e.g., a laptop computer.

FIG. 1 is a block diagram of an exemplary deployable secure communication system, in accordance with a first embodiment of the present invention.

In particular, FIG. 1 shows a deployable communications module 112 including a secure encryption module, e.g., one built according to KIV-7 requirements, and an IP encapsulator of serial data 204. On the red, non-secure side of the deployable communications module 112, voice communications 110 and/or data communications such as from a laptop computer 111 or other digital device are provided with suitable interfaces.

The IP encapsulator 204 is a full-duplex device providing both IP encapsulation of encrypted synchronous serial RS-530 data emanating from the encryption unit 200, as well as IP decapsulation of IP data addressed to the IP address of the IP encapsulator 204 from a distant source, and passing the decapsulated, presumably encrypted data to the RS-530 synchronous serial data port of the encryption unit 200 for playback by the telephone 110 (if voice data) or receipt by the laptop computer 111 (if data destined for the computer).

The analog telephone 110 may interface with a standard 2-wire telephone loop. Alternatively, the telephone may be a digital telephone and be provided with an ISDN type digital subscriber link to the deployable communications module 112. The laptop computer may communicate with the deployable communications module 112 using a standard Ethernet 10baseT or 100baseT type network link.

On the black, or secure side, the disclosed deployable system includes an Inmarsat M4 terminal 114 providing a direct connection to an enterprise network via a satellite. The M4 Satellite terminal is, e.g., a Nera WorldCommunicator portable Inmarsat M4 satellite terminal, which is a portable Inmarsat M4 satellite terminal capable of providing 64 kbps ISDN connectivity to remote users. Additional features include a 3-panel antenna with RF transceiver; a wireless DECT 2.4 Ghz Handset; and a modem unit and battery pack.

The embodiment also provides an Ethernet direct connection to a local enterprise network, e.g., a hotel Ethernet network having direct access to the Internet, high speed cable, etc. Thus, when the deployable communication system is in the convenience of modern accommodations, such as in a hotel or other public place that provides an Ethernet link to the Internet, such services may be utilized without the need to set up the direct connection using the Inmarsat M4 terminal 114.

It is important to understand that this direct connection to the Internet is on the black side of the deployable communication system, thus bulk encrypted data (i.e., secure data) may be conveniently routed along the public Internet 101 to a desired destination. This saves bandwidth on the relevant satellite, and also battery power necessary to drive the satellite transceiver. It also simply provides secure communications while in a hotel room or similar public place, near a cable modem, etc.

Figure 2:
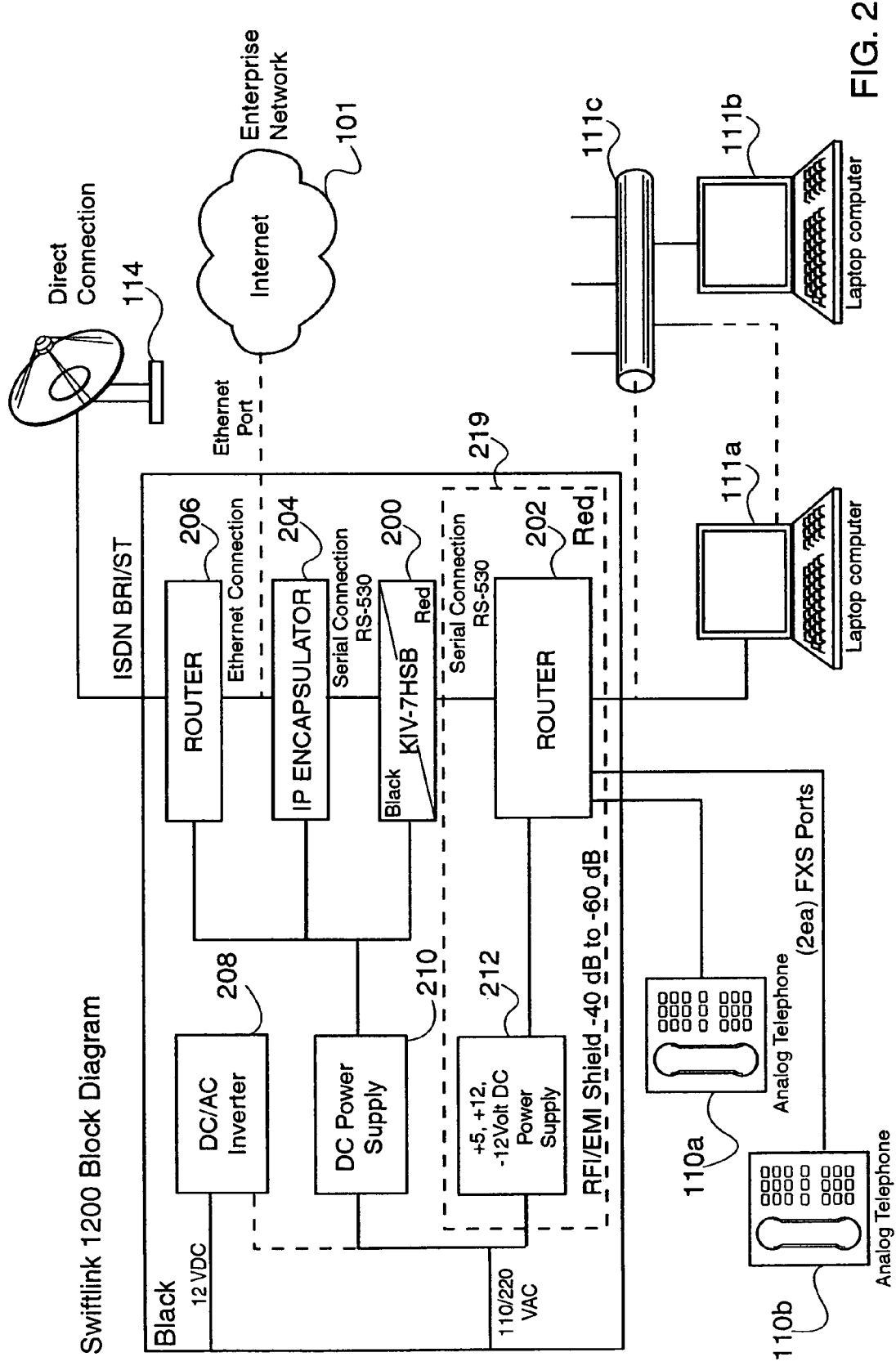
FIG. 2 is a more detailed block diagram of the exemplary deployable secure communication system shown in FIG. 1.

FIG. 2 is a more detailed block diagram of the exemplary deployable secure communication system shown in FIG. 1.

In particular, as shown in FIG. 2, the deployable communications module 112 includes a black (encrypted, or secure) portion and a red (non-encrypted, or unsecure) portion.

The red portion includes a router 202, e.g., a Cisco 1751-V voice enabled modular access router. This router 202 includes one fast Ethernet (10/100 BaseTX) port; Interface cards support either WIC or VIC modules; and it supports VoIP, VoFR, and VoATM connections.

The red portion also includes a suitable power supply such as the +5V, +12V and −12V power supply 212 shown in FIG. 2. The red components are shielded in a suitable RFI/EMI shielding preferably providing −40 dB to −60 dB of isolation. The compartment in which the red components sit may also be coated with a suitable RFI/EMI isolating coating.

The black portion includes a KIV-7 device 200 such as the KIV-7HSB shown in FIG. 2. The disclosed KIV-7HSB is a Mykotronx KIV-7 module is a standard compact, economical, high performance, and user-friendly COMSEC device, designed to meet users' needs for secure data communication links. Features of this unit include Commercial Off-the-shelf (COTS) Type I data encryption; KG-84/-84A/-84C interoperability; User-friendly menu-based operator interface; and Standard D-type rear-panel interface connectors.

The IP encapsulator 204 may be any suitable product that can invisibly encapsulate serial data (e.g., synchronous serial data from an RS-530 port) into IP packets addressed to another IP encapsulator 204 operating to de-encapsulate the same IP packets and pass the data back into a suitable serial data stream (e.g., an RS-530 data stream). Thus, the IP encapsulator 204, IP network, and receiving IP encapsulator operate invisibly as if the RS-530 data ports (sending and receiving) were plugged into one another. The product utilized in the disclosed embodiment is an IPTube-RS530 model that is commercially available from Engage Communication in Aptos, Calif.

The IP encapsulator 204 encapsulates encrypted data, and passes it either to an Ethernet port which may be wired directly to an Ethernet network having access to the Internet 101, or to a black-side router 206 (e.g., commercially available from CISCO). The router 206 includes an ISDN port (ISDN/BRI/ST) to link to the Inmarsat M4 terminal 114.

The KIV-7 preferably uses a serial RS-530 connection both on its red side to the red side router 202, as well as on the black side to connect to the IP encapsulator 204. The red side router 202 is suitably configured for operation with the KIV-7 encryption device 200.

The red side router 202 is configured to allow for transparent, automated operation for the user. All off-network traffic is routed via the serial port to the KIV-7HSB for bulk encryption. In addition, the voice ports are configured so that dialing a "9" (or any other string desired by the user) will result in off-network traffic and be routed to the distant end gateway.

The particularly IP encapsulator 204 used in the disclosed embodiments, the IPTube, allows acceptance of encrypted data. The clock in the IPTube is preferably tuned to match the RS-530 synchronous serial data output of the KIV-7HSB. In addition, it is further preferred that the IPTube allow for a dial-on-demand type feature so that the IP encapsulator 204 would be in an idle state until interesting traffic were presented.

The IP encapsulator 204 is configured so as to seek a specific distant end device and establish a dedicated tunnel therewith. The internal side of the IP encapsulator 204 is configured to seek a specific (distant end) IP address. The distant end device is configured to seek the opposite. Once located, the two IP encapsulators 204 communicate and establish the tunnel.

Figure 3:
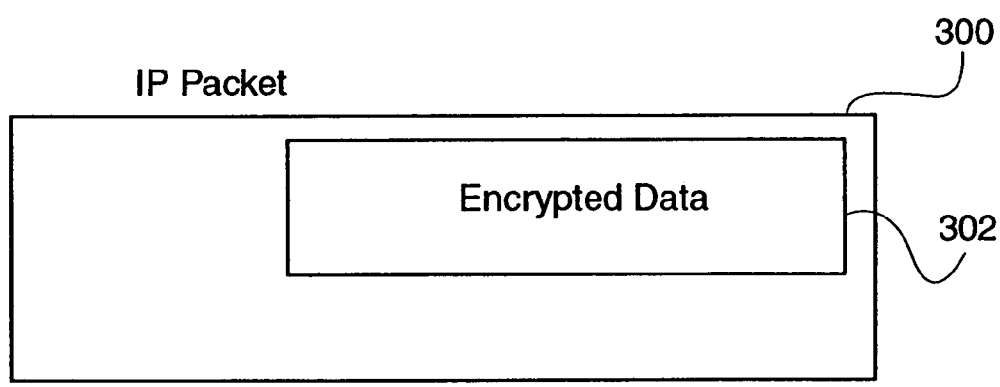
FIG. 3 shows encrypted data encapsulated within an IP packet, in accordance with the principles of the present invention.

FIG. 3 depicts an IP packet encapsulating a payload of encrypted data 302 encrypted by an encryption unit such as the KIV-7. The IP packet 300 is addressed to another IP encapsulator also accessible to the relevant IP network, e.g., the Internet. The receiving IP encapsulator retrieves the encryupted data 302 from the IP packet, and converts it back to the appropriate serial data form (e.g., synchronous RS-530 data) and passes it on to its encryption unit (e.g., a KIV-7) for decryption.

Figure 4:
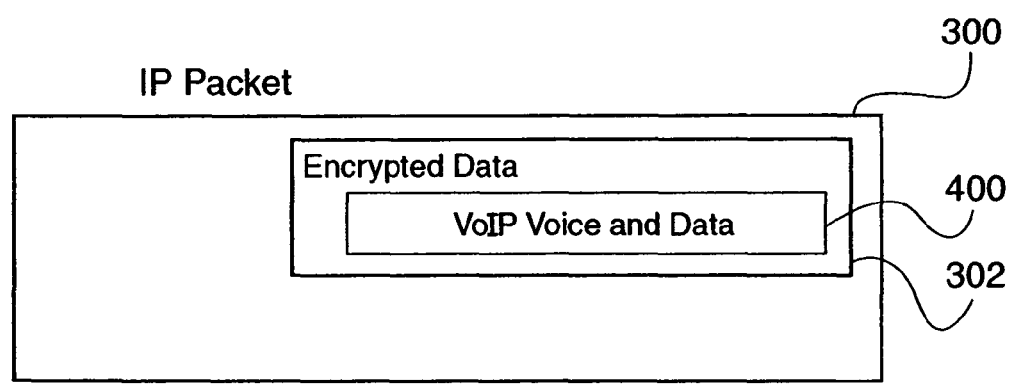
FIG. 4 shows that the encrypted data encapsulated within an IP packet may be Voice over IP data (VoIP).
Figure 5:
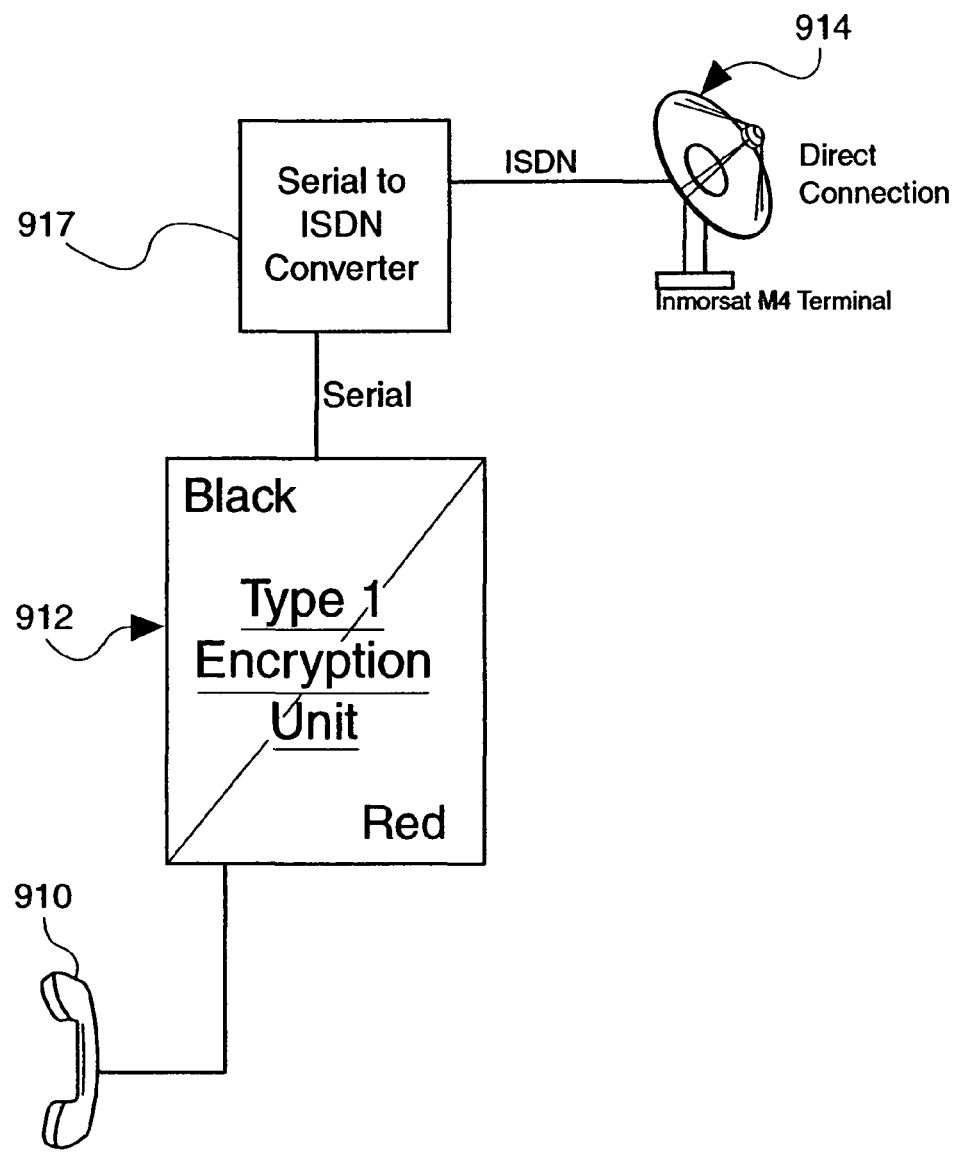
FIG. 5 is a depiction of a particular conventional deployable secure communication system.

FIG. 4 shows that the encapsulated encrypted data may be Voice over IP data (VoIP).

Referring back to FIG. 2, the laptop computer 111a depicts in solid line a one-to-one connection into the red side router 202. In a dotted line depiction, multiple computing devices 111a-111b may be networked over a conventional Ethernet network 111c, with the red side router 202 being a member of that Ethernet network 111c.

Any computing device capable of an Ethernet connection may be implemented. In the disclosed embodiment, the laptop computers that were implemented were Panasonic Toughbooks™. Those laptop computers are ruggedized in that it is shock, dust, vibration and water resistant, making it a good choice for a deployable communication system. Additional features include design to MIL-STD-810F test procedures; and password security (Supervisor, User), "Access Key".

The deployable communication system communicates over the Internet (considered black with respect to the bulk encrypted data passed through the Ethernet port of the IP encapsulator 204) with a suitable IP gateway (not shown). As long as both sides know the IP address of the other, and the IP encapsulator 204 is properly configured, communications will be enabled.

Both the red side router 202 and the black side router 206 are configured to maintain QOS. The link fragmentation and packet interleaving are preferably implemented to assure voice quality. PPP multilinking may be utilized to maximize performance.

Routing information is not passed through the KIV-7HSB 200. Rather, the black side router 206 provides the routing of the WAN link. The red side router 202 provides the routing information for the network traffic and is contained in the encrypted payload encapsulated by the IP encapsulator 204. This information is passed from red side router 202 to red side router of a receiving device.

The disclosed deployable communication system provides up to two simultaneous voice-over-IP calls along with normal data connectivity. Connectivity between the remote system and the enterprise network is provided by the Inmarsat M4 terminal, through connection to a terrestrial ISDN circuit, or by connection to a network or the Internet. Transmissions between the deployed system and enterprise network are encrypted and fully secure up through the Top Secret level through the use of a KIV-7 bulk encryption device.

The deployable communication system allows for routing of bulk encrypted data, a feature not available in any other deployable communication system employing a KIV-7 encryption device.

In the disclosed embodiment, commercial off the shelf (COTS) equipment is integrated at the board level into an outer case made of high quality plastics. The COTS (i.e., commercially available) equipment includes the Cisco 1751V router 202, the Cisco 801 router 206, the Engage Communications IPTube-RS-530 204, the KIV-7HSB encryption unit 200, the tri-volt power supply 212, the DC power supply 210, and a DC/AC inverter 208.

Individual components are preferably integrated in such a manner so as to provide separation between encrypted and non-encrypted data, and to ensure protection of the components. Additionally, the specific integration and configuration of the system allows for operation by simply deploying the M4 terminal and applying power. Ideally, the deployable communication system 112 can be powered by universal AC input or by 12 VDC from a vehicle cigarette lighter.

Data entering the deployable communication system 112 and destined for the enterprise network is routed by the red side router 202 and passed to the encryption unit 200 for encryption. Once encrypted, the data is then passed to the IP encapsulator (e.g., IPTube-RS530) 204, where it is encapsulated into IP packets and passed to the black side Cisco 801 Ethernet to ISDN router 206.

This data is then passed out of the ISDN port of the black side router 206, and on to the direct connection to the Inmarsat M4 Terminal 114, where it is transmitted to the enterprise network.

The deployable communication system 112 accomplishes two specific functions during transmission.

Firstly, an IPSEC tunnel is established between the black side router 206 and a gateway router at the receiving fixed enterprise. This provides privacy for the overall link. Moreover, and very importantly, it presents a commercial/civilian appearance to the transmitted encrypted signal.

Secondly, another tunnel is established between the deployed IP encapsulator 204 and another IP encapsulator at the fixed enterprise network (or other remote deployable, secure communications terminal).

With this second tunnel established, bulk encrypted data from a KIV-7 type encryption unit 200, which is normally non-routable, is importantly encapsulated in IP packets and routed to the distant end network.

Data encrypted by the KIV-7HSB encryption module 200 normally requires a dedicated, point-to-point circuit for communications to be successful. This is significant for two reasons.

First, through the use of the disclosed deployable communication system bulk encrypted data can be routed, thus making use of generic IP or network connections. Moreover, while the deployable communication system would normally be operated with a direct, one to one connection via the Inmarsat M4 Terminal 114, the process of encapsulating the bulk encrypted data into IP packets, and thus routing of the bulk encrypted data, allows for connecting the system into any network—or directly into the Internet via the Ethernet port made available at the output of the IP encapsulator 204.

Second, the unique signature of the government used Type 1 encryption is masked by the two separate tunnels and appears as normal commercially encrypted data, thus providing a level of cover to individual operators.

The deployable communications system preferably includes grounding incorporated into grounded AC Power, and is contained in a single deployable case. The disclosed deployable communication system measured about 17"×12"×5" and weighed about 40 pounds, though other small measurements and light weight systems are within the scope of the present invention.

A universal front end accepts between 86-240VAC and provides 24 volts DC to the on-board batteries and the DC/AC inverter. The inverter conditions the power and provides a stable 110 VAC output for the network components. In the event of commercial power loss, the on-board batteries are sufficient to support operations for the required minimum of 15 minutes and have been tested to operate in excess of 45 minutes. Operation of all system components in a hot standby mode has been demonstrated in excess of two hours. In the event the internal batteries are depleted prior to commercial power restoration, two external 12 volt car batteries can be jumper together and connected into the module for continued operation. This module is integrated into a custom roll-around case measuring 15"W×24"L×9"D and weighs about 72 lbs including batteries.

Preferably, expansion capabilities may be implemented to support additional users. Moreover, multiple connectivity may be provided by including flexible connection methods and speeds for voice, video and data services, including: a VSAT terminal, an ISDN terminal, an Inmarsat terminal, a conventional dial-up modem, and operate in either a secure or non-secure communications mode.

A single case deployable communications system in accordance with the principles of the present invention has particular application with the US military, federal, local and state agencies, disaster recovery agencies, public safety associations, news channels, and commercial enterprises, to name a few.

The disclosed deployable communication system preferably allows for operation "out of the box", meaning the only component requiring removal is the M4 terminal. Moreover, the deployable communication system is preferably of a size and weight so as to be capable of transport on commercial aircraft as checked baggage.

The term 'encryption' as used herein and in the appended claims relates to a military grade disguising of data in a way intended for proper decryption only by an authorized receiving device.

The present invention is disclosed and described with respect to a KIV-7 encryption unit. The principles of IP encapsulation of encrypted data relate equally well to any type military grade encryption unit, e.g., a KIV-21.

While the invention has been described with reference to the exemplary embodiments thereof, those skilled in the art will be able to make various modifications to the described embodiments of the invention without departing from the true spirit and scope of the invention.

What is claimed is:

1. A method of cloaking an encrypted serial data stream, comprising:
   formulating, with an encryption device associated with a portable secure communication system, an encrypted serial data stream;
   establishing, prior to transmission over a non-secure IP network, a serial data path connecting an encryption device output and an Internet Protocol (IP) encapsulator input;
   encapsulating, with said IP encapsulator associated with said portable secure communication system, said encrypted serial data stream into IP packets;
   establishing a first data tunnel between said IP encapsulator and a first remote IP encapsulator;
   establishing a second data tunnel between said IP encapsulator and a second remote IP encapsulator; and
   transmitting said IP packets of encrypted serial data over a non-secure IP network using said data tunnel and said second data tunnel.

2. The method of cloaking an encrypted serial data stream according to claim 1, wherein:
   said public network is an Internet.

3. The method of cloaking an encrypted serial data stream according to claim 1, wherein:
   said IP packets are transmitted via an ISDN router.

4. The method of cloaking an encrypted serial data stream according to claim 1, wherein:
   said IP packets are transmitted over a satellite terminal.

5. The method of cloaking an encrypted serial data stream according to claim 1, further comprising:
   encrypting data using a Type 1 encryption unit.

6. The method of cloaking an encrypted serial data stream according to claim 5, wherein said Type 1 encryption unit comprises:
   a KIV type encryption unit.

7. The method of cloaking an encrypted serial data stream according to claim 6, wherein said Type 1 KIV-type encryption unit comprises:
   a KIV-7 encryption unit.

8. The method of cloaking an encrypted serial data stream according to claim 1, wherein said serial data stream of encrypted data comprises:
   Voice over IP (VoIP) data.

9. The method of cloaking an encrypted serial data stream according to claim 1, wherein:
   said encrypted serial data stream is a synchronous serial data stream.

10. The method of cloaking an encrypted serial data stream according to claim 9, wherein:
    said synchronous encrypted serial data stream is an RS-530 data stream.

11. The method of cloaking an encrypted serial data stream according to claim 1, further comprising:
    combining data from two voice sources; and
    encrypting said combined data stream into said encrypted serial data stream before said encapsulating.

12. Apparatus for cloaking an encrypted serial data stream in a deployable, portable secure communication terminal, comprising:
    means for formulating, with an encryption device associated with a portable secure communication system, an encrypted serial data stream;
    means for establishing, prior to transmission over a non-secure IP network, a serial data path connecting an encryption device output and an Internet Protocol (IP) encapsulator input;
    means for encapsulating, with said IP encapsulator associated with said portable secure communication system, said encrypted serial data stream into IP packets;
    means for establishing a first data tunnel between said IP encapsulator and a first remote IP encapsulator, and a second data tunnel between said IP encapsulator and a second remote IP encapsulator; and
    means for transmitting said IP packets of encrypted serial data over a non-secure IP network.

13. The apparatus for cloaking an encrypted serial data stream in a deployable, portable secure communication terminal according to claim 12, wherein:
    said public network is an Internet.

14. The apparatus for cloaking an encrypted serial data stream in a deployable, portable secure communication terminal according to claim 12, wherein:
   said IP packets are transmitted via an ISDN router.

15. The apparatus for cloaking an encrypted serial data stream in a deployable, portable secure communication terminal according to claim 12, wherein:
   said IP packets are transmitted over a satellite terminal.

16. The apparatus for cloaking an encrypted serial data stream in a deployable, portable secure communication terminal according to claim 12, further comprising:
   means for encrypting data using a Type 1 encryption unit.

17. The apparatus for cloaking an encrypted serial data stream in a deployable, portable secure communication terminal according to claim 16, wherein said Type 1 encryption unit comprises:
   a KIV type encryption unit.

18. The apparatus for cloaking an encrypted serial data stream in a deployable, portable secure communication terminal according to claim 17, wherein said Type 1 KIV-type encryption unit comprises:
   a KIV-7 encryption unit.

19. The apparatus for cloaking an encrypted serial data stream in a deployable, portable secure communication terminal according to claim 12, wherein said serial data stream of encrypted data comprises:
   Voice over IP (VoIP) data.

20. The apparatus for cloaking an encrypted serial data stream in a deployable, portable secure communication terminal according to claim 12, wherein:
   said encrypted serial data stream is a synchronous serial data stream.

21. The apparatus for cloaking an encrypted serial data stream in a deployable, portable secure communication terminal according to claim 20, wherein:
   said synchronous encrypted serial data stream is an RS-530 data stream.

22. The apparatus for cloaking an encrypted serial data stream in a deployable, portable secure communication terminal according to claim 12, further comprising:
   means for combining data from two voice sources; and
   means for encrypting said combined data stream into said encrypted serial data stream before said encapsulating.

23. The apparatus for cloaking an encrypted serial data stream in a deployable, portable secure communication terminal according to claim 22, wherein said means for combining data from two voice sources comprises:
   a voice-enabled router.

* * * * *